(12) United States Patent
Marji (10) Patent No.: US 9,882,252 B2
(45) Date of Patent: Jan. 30, 2018

(54) CONTROLLED BATTERY BOX

(71) Applicant: MAXON INDUSTRIES, INC., Santa Fe Springs, CA (US)

(72) Inventor: George Y. Marji, La Mirada, CA (US)

(73) Assignee: MAXON INDUSTRIES, INC., Santa Fe Springs, CA (US)

( * ) Notice: Subject to any disclaimer, the term of this patent is extended or adjusted under 35 U.S.C. 154(b) by 358 days.

(21) Appl. No.: 14/361,693

(22) PCT Filed: Nov. 30, 2012

(86) PCT No.: PCT/US2012/067314
§ 371 (c)(1),
(2) Date: May 29, 2014

(87) PCT Pub. No.: WO2013/082439
PCT Pub. Date: Jun. 6, 2013

(65) Prior Publication Data
US 2014/0328659 A1    Nov. 6, 2014

Related U.S. Application Data

(60) Provisional application No. 61/565,428, filed on Nov. 30, 2011.

(51) Int. Cl.

| H01M 10/60 | (2014.01) |
|---|---|
| H01M 10/63 | (2014.01) |
| H01M 10/48 | (2006.01) |
| B60P 1/44 | (2006.01) |
| H01M 10/625 | (2014.01) |
| H01M 10/615 | (2014.01) |
| H01M 10/633 | (2014.01) |

(Continued)

(52) U.S. Cl.
CPC ......... *H01M 10/502* (2013.01); *B60P 1/4414* (2013.01); *B60P 1/4471* (2013.01);

(Continued)

(58) Field of Classification Search
None
See application file for complete search history.

(56) References Cited

U.S. PATENT DOCUMENTS

| 4,913,985 A * | 4/1990 | Baer | H01M 10/6568 |
|---|---|---|---|
| | | | 429/120 |
| 2007/0152502 A1* | 7/2007 | Kinsey | H02J 1/14 |
| | | | 307/10.1 |

(Continued)

OTHER PUBLICATIONS

International Preliminary Report on Patentability dated Jun. 12, 2014 for International Application No. PCT/US2012/067314 from International Bureau of WIPO, pp. 1-10, Geneva, Switzerland.

(Continued)

*Primary Examiner* — Scott J Chmielecki
(74) *Attorney, Agent, or Firm* — Brooks Acordia IP Law, PC; Michael Zarrabian (57) ABSTRACT

A battery container for battery temperature control comprises a housing including an enclosure for receiving a battery, wherein at least a portion of the housing comprises a thermal insulation material for insulating the interior of the enclosure against ambient temperature. The battery container further comprises a temperature control element disposed within the enclosure, wherein the temperature control element reduces the rate of heat transfer between the ambient and the interior of the enclosure. The temperature control element comprises an active temperature control element. The battery container further comprises a controller that in response to a signal indicating battery temperature, controls the active temperature control element for reducing the rate of heat transfer between the ambient and the interior of the enclosure.

29 Claims, 9 Drawing Sheets

(51) Int. Cl.
- *H01M 10/6571* (2014.01)
- *H01M 10/61* (2014.01)
- *H01M 10/635* (2014.01)
- *H01M 10/6572* (2014.01)
- *H01M 10/613* (2014.01)
- *H01M 10/658* (2014.01)
- *H01M 2/10* (2006.01)
- *H01M 10/44* (2006.01)

(52) U.S. Cl.
CPC ....... *H01M 2/1094* (2013.01); *H01M 10/486* (2013.01); *H01M 10/61* (2015.04); *H01M 10/613* (2015.04); *H01M 10/615* (2015.04); *H01M 10/625* (2015.04); *H01M 10/633* (2015.04); *H01M 10/635* (2015.04); *H01M 10/658* (2015.04); *H01M 10/6571* (2015.04); *H01M 10/6572* (2015.04); *H01M 2/1077* (2013.01); *H01M 2/1083* (2013.01); *H01M 10/44* (2013.01); *H01M 2220/20* (2013.01)

(56) References Cited

U.S. PATENT DOCUMENTS

| | | | |
|---|---|---|---|
| 2008/0012535 A1* | 1/2008 | Takatsuji | B60L 3/0046 320/150 |
| 2008/0272131 A1 | 11/2008 | Roberts et al. | |
| 2008/0311466 A1* | 12/2008 | Yang | H01M 10/486 429/62 |
| 2008/0311468 A1 | 12/2008 | Yang et al. | |
| 2009/0033285 A1 | 2/2009 | Tomura et al. | |
| 2009/0179616 A1* | 7/2009 | Ichikawa | B60L 3/0046 320/134 |
| 2010/0116570 A1* | 5/2010 | Sugawara | B60K 1/04 180/65.1 |
| 2010/0293611 A1* | 11/2010 | Ablabutyan | B60P 1/4471 726/17 |
| 2011/0043212 A1* | 2/2011 | Kirchev | G01R 31/3675 324/427 |
| 2011/0206948 A1* | 8/2011 | Asai | H01M 2/0473 429/7 |
| 2011/0308765 A1* | 12/2011 | Kumar | B60L 11/1874 165/47 |
| 2011/0316486 A1* | 12/2011 | Inaba | B60L 1/003 320/150 |
| 2013/0266838 A1* | 10/2013 | Von Borck | F28F 3/12 429/120 |

OTHER PUBLICATIONS

International Search Report and Written Opinion dated Feb. 6, 2013 for International Application No. PCT/US12/67314, pp. 1-14, United States Patent and Trademark Office, Virginia, United States.

* cited by examiner

Detail A

CONTROLLED BATTERY BOX

CROSS REFERENCE TO RELATED APPLICATIONS

This application is the U.S. National Phase Patent Application under 35 U.S.C. § 371 of International Application Number PCT/US2012/067314, filed Nov. 30, 2012, which claims the priority benefit of U.S. Provisional Patent Application Ser. No. 61/565,428 filed Nov. 30, 2011. Both applications, International Application Number PCT/US2012/067314 and U.S. Provisional Patent Application Ser. No. 61/565,428, are incorporated herein by reference in their entirety.

BACKGROUND OF THE INVENTION

Field of the Invention

The present invention relates generally to battery boxes and, in particular, to controlled battery boxes for lift gates.

Description of Related Art

Lifts such as lift gates are typically mounted at a structure such as an opening at the rear of a vehicle to lift payloads on a lift platform from one level (e.g., ground level) up to another level (e.g., the bed of the vehicle), or vice versa. One type of lift gate employs linkages to maintain the lift platform in a horizontal plane through the lifting range. The lift platform is attached to linkages by pivot members, which allow the lift platform to be pivoted. When in the vertical position, operation of the lifting mechanism rotates the lift platform into an inverted, stowed position beneath the vehicle body.

Hydraulic actuators, hydraulic fluid pump motors, electric actuators, etc. are used to provide lifting force for moving the lift platform. To control the motion of the lift platform, switches are wired to the actuators for controlling motion of the lift by an operator interacting with the toggle switches.

Said actuators and electrical motors are typically powered by electrical power provided by power sources such as batteries (e.g., DC batteries used in vehicles). Such batteries are generally dedicated batteries for the operation of the lift gate and are placed in housings known as battery boxes.

Lift gate battery boxes are typically constructed from welded sheet metal for receiving one or more batteries and installed on underbody of the vehicle (e.g., truck, trailer) to which the lift gate is mounted. Batteries for the operation of lift gates are stored in such battery boxes. Because battery box location is subjected to various ambient temperatures, such battery boxes dramatically affect battery performance, run times, charging times, and battery life. Different temperatures also affect batteries internal chemical reaction rates, internal resistance, and efficiency.

BRIEF SUMMARY OF THE INVENTION

In one embodiment the present invention provides a controlled battery box for maintaining lift gate batteries therein within desired operating temperatures. In one embodiment the present invention comprises a battery container for battery temperature control, comprising a housing including an enclosure for receiving a battery, wherein at least a portion of the housing comprises a thermal insulation material for insulating the interior of the enclosure against ambient temperature. The battery container further includes a temperature control element disposed within the enclosure, wherein the temperature control element reduces the rate of heat transfer between the ambient and the interior of the enclosure.

In one embodiment, the temperature control element comprises a passive temperature control element. In one embodiment, the temperature control element comprises an active temperature control element. In one embodiment, the temperature control element comprises a passive temperature control element and an active temperature control element.

In one embodiment, the present invention provides a controller that, in response to a signal indicating battery temperature, controls the active temperature control element for reducing the rate of heat transfer between the ambient and the interior of the enclosure to maintain the battery temperature within a selected temperature range.

In one embodiment, the present invention provides a controller, wherein in response to a first signal indicating battery temperature and a second signal representing battery voltage, the controller controls the active temperature control element to maintain the battery temperature within a selected temperature range for essentially optimal battery operation status for powering an electrical load.

In one embodiment, the present invention provides a controller that comprises a temperature comparator circuit that compares a signal indicating battery temperature to a signal indicating a temperature set point to detect a temperature difference therebetween. Based on the detected difference, the controller controls the active temperature control element to reduce the temperature difference.

In one embodiment, the controller further comprises a voltage comparator circuit that compares a signal indicating battery voltage to a signal indicating a voltage set point, to detect a battery state of charge. The controller controls the active temperature control element to reduce the temperature difference further based on said detected battery state of charge.

In one embodiment, the present invention provides a lift gate system comprising a lift gate assembly including a lifting platform coupled to a linkage mechanism and an actuator for moving the lifting platform via the linkage mechanism. The lift gate system further comprises a battery for powering the actuator for moving the lifting platform. The lift gate system further comprises a battery container for housing said battery, the battery container including an enclosure for receiving the battery, wherein at least a portion of the housing comprises a thermal insulation material for insulating the interior of the enclosure against ambient temperature. The lift gate system further comprises a temperature control element disposed within the enclosure, wherein the temperature control element reduces the rate of heat transfer between the ambient and the interior of the enclosure.

In one embodiment, the temperature control element comprises an active temperature control element. In one embodiment, the lift gate system further includes a controller that comprises a temperature comparator circuit that compares a signal indicating battery temperature to a signal indicating a temperature set point to detect a temperature difference therebetween. Based on the detected difference, the controller controls the active temperature control element to reduce the temperature difference.

In one embodiment, the controller further comprises a voltage comparator circuit that compares a signal indicating battery voltage to a signal indicating a voltage set point to detect a battery state of charge. The controller controls the active temperature control element to reduce the temperature difference further based on said detected battery state of charge.

These and other features, aspects, and advantages of the present invention will become understood with reference to the following description, appended claims, and accompanying figures.

DETAILED DESCRIPTION OF THE INVENTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The present invention relates to a battery container system. In one embodiment the present invention comprises a battery container for battery temperature control, comprising a housing including an enclosure for receiving a battery, wherein at least a portion of the housing comprises a thermal insulation material for insulating the interior of the enclosure against ambient temperature. The battery container further includes a temperature control element disposed within the enclosure, wherein the temperature control element reduces the rate of heat transfer between the ambient and the interior of the enclosure.

In one embodiment, the temperature control element comprises a passive temperature control element. In one embodiment, the temperature control element comprises an active temperature control element. In one embodiment, the temperature control element comprises a passive temperature control element and an active temperature control element.

In one embodiment, the present invention provides a controller that, in response to a signal indicating battery temperature, controls the active temperature control element for reducing the rate of heat transfer between the ambient and the interior of the enclosure to maintain the battery temperature within a selected temperature range.

In one embodiment, the present invention provides a controller, wherein in response to a first signal indicating battery temperature and a second signal representing battery voltage, the controller controls the active temperature control element to maintain the battery temperature within a selected temperature range for essentially optimal battery operation status for powering an electrical load.

In one embodiment, the present invention provides a controller that comprises a temperature comparator circuit that compares a signal indicating battery temperature to a signal indicating a temperature set point to detect a temperature difference therebetween. Based on the detected difference, the controller controls the active temperature control element to reduce the temperature difference.

In one embodiment, the controller further comprises a voltage comparator circuit that compares a signal indicating battery voltage to a signal indicating a voltage set point to detect a battery state of charge. The controller controls the active temperature control element to reduce the temperature difference further based on said detected battery state of charge.

One of the applications of the battery container is for lift gates because of higher amperage draw required by a lift gate pump motor. When batteries are fully charged and used in low temperatures, their amperage capacity drops below manufacturer-specified rating. For example, a 100% fully-charged battery in 25° C. (77° F.) with rated capacity of 75 Ahr exhibits a reduced rated capacity (down to 33 Ahr) when the temperature drops to −4° F. Furthermore, when batteries are not fully charged, their electrolytes will freeze at a lower freezing point as shown in Table 1 below. Thus, more time is required to charge the batteries in cold weather.

TABLE 1

| Digital Voltmeter Open Circuit Voltage | Approximate State-of-Charge | Hydrometer | |
| --- | --- | --- | --- |
| | | Average Cell Specific Gravity | Electrolyte Freeze Point |
| 12.65 | 100% | 1.265 | −75° F. (−59.4° C.) |
| 12.45 | 75% | 1.225 | −55° F. (−48.3° C.) |
| 12.24 | 50% | 1.190 | −34° F. (−36.7° C.) |
| 12.06 | 25% | 1.155 | −16° F. (−26.7° C.) |
| 11.89 | Discharged | 1.120 | −10° F. (−23.3° C.) |

As shown in Table 1 above, lift gate battery capacity and charging time are affected by temperature.

In one embodiment, the present invention provides a lift gate system comprising a lift gate assembly including a lifting platform coupled to a linkage mechanism and an actuator for moving the lifting platform via the linkage mechanism. The lift gate system further comprises a battery for powering the actuator for moving the lifting platform. The lift gate system further comprises a battery container for housing said battery, the battery container including an enclosure for receiving the battery, wherein at least a portion of the housing comprises a thermal insulation material for insulating the interior of the enclosure against ambient temperature. The lift gate system further comprises a temperature control element disposed within the enclosure, wherein the temperature control element reduces the rate of heat transfer between the ambient and the interior of the enclosure.

In one embodiment, the temperature control element comprises an active temperature control element. In one embodiment, the lift gate system further includes a controller that comprises a temperature comparator circuit that compares a signal indicating battery temperature to a signal indicating a temperature set point to detect a temperature difference therebetween. Based on the detected difference, the controller controls the active temperature control element to reduce the temperature difference.

In one embodiment, the controller further comprises a voltage comparator circuit that compares a signal indicating battery voltage to a signal indicating a voltage set point to detect a battery state of charge. The controller controls the active temperature control element to reduce the temperature difference further based on said detected battery state of charge.

Figure 1:
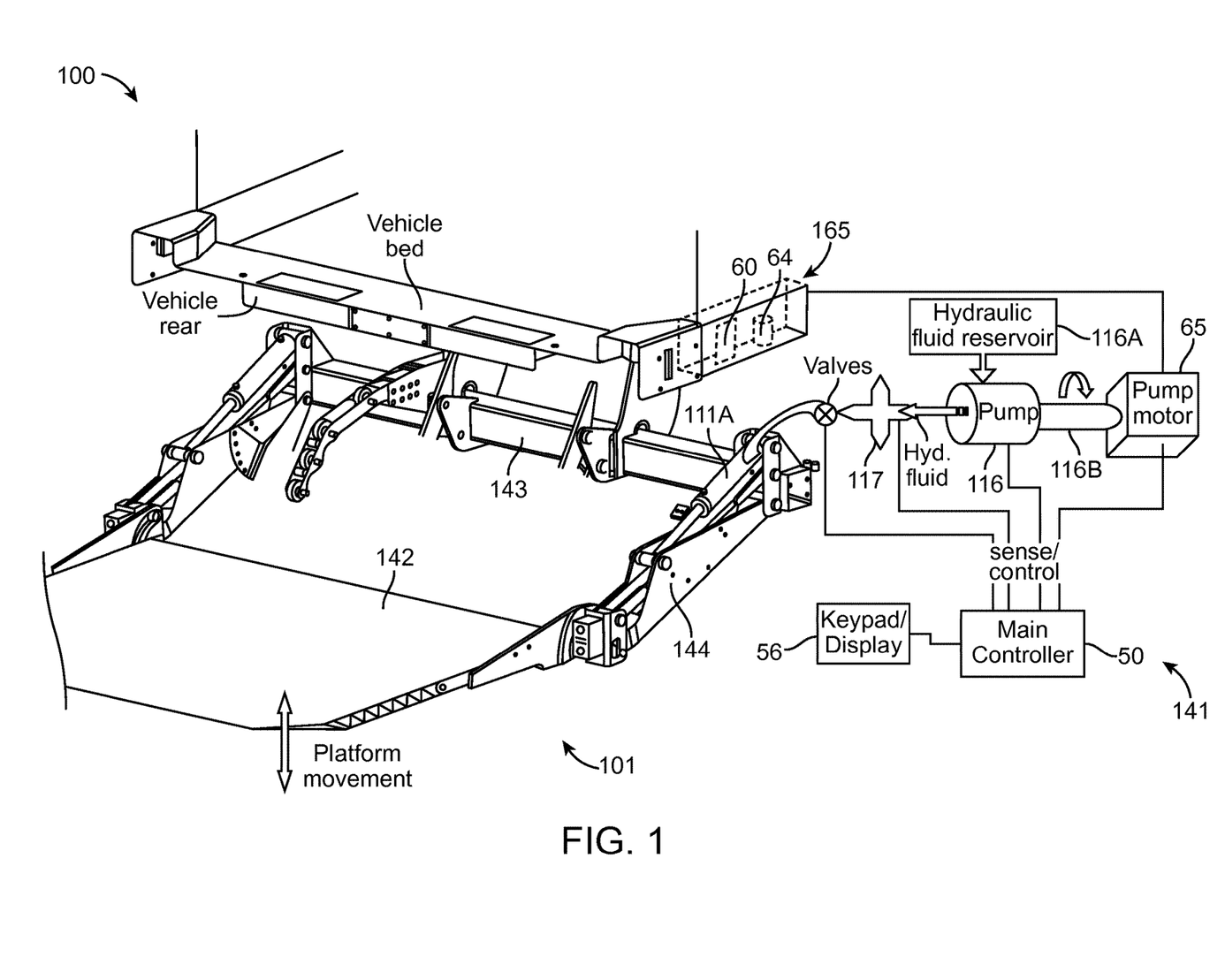
FIG. 1 shows an example lift system comprising a lift gate assembly and power system, according to an embodiment of the invention.

FIG. 1 shows an example lift system 100 comprising a lift gate assembly 101 and power system 141, according to an embodiment of the invention. The lift gate assembly 101 is attached to a vehicle (bed of truck, partially shown) and includes a platform 142 (shown in unfolded and lowered position) coupled to a support frame 143 via a lift linkage 144, wherein the platform 142 is capable of being moved (lowered/raised) by a hydraulic actuator 111A via the lift linkage 144.

In this embodiment, the power system 141 comprises an electric pump motor 65 coupled to a hydraulic pump 116 by a coupler 116B to directly drive the pump 116. The coupler 116B may comprise a rotating axle connected between crank shaft of the motor 65 and the pump 116 or may comprise a viscous coupling, etc. The pumping action of the pump 116 directs hydraulic fluid from the reservoir 116A to the manifold 117, and hydraulic fluid from the manifold 117 flows to the hydraulic actuator 111A using pipes/tubes.

A keypad 56 includes user operable interface such as buttons, levers, etc., for receiving operator commands for operating the lift gate (e.g., lower/raise platform, stow/unstow lift gate). The keypad 56 may also include display devices (and may include audio devices) for providing the operator with information about one or more of the lift gate, the actuator system, the power system, etc. The operator commands from the keypad 56 are processed by a main controller 50 for controlling operation of the lift gate 101.

In one embodiment, the main controller 50 functions to ensure that the power system (e.g., pump motor and the actuator system) operates in a way to provide proper level of power (such as electrical power) to the lift gate as demanded by operation of the lift gate assembly 101 from an operator. The main controller 50 controls operation of the lift gate based on certain operational parameters of the lift gate assembly 101. For example, after powering on, sensor data are obtained by the controller 50. Sensor data may include, for example, power supply voltages from a battery 64, electric current, cycle of the operation of the lift, and load on the lift, etc.

In one example, the electric motor 65 may installed in a housing mounted on a frame of the vehicle (e.g., under the vehicle bed) near the hydraulic system and coupled to the pump motor 65 to drive the pump 116 (e.g., via an axle, viscous coupling, etc.). The main controller 50 may be placed in a pump box with the pump motor 65 and the hydraulic pump 116, and connected to various sensors, the pump motor 65, valves, the lift gate key pad 56, etc. The main controller 50 may also be placed elsewhere on the vehicle, and connected to various sensors, the pump motor 65, the valves, the lift gate key pad 56, etc.

In one embodiment, the lift gate system 100 further includes a battery container comprising a controlled battery box 165 that houses a DC power supply for the lift gate system. In one embodiment, the DC power supply comprises one or more batteries 64 that provide electrical power for operation of the lift gate assembly 101 as described above. In one embodiment of the invention, the controlled battery box 165 provides a barrier to the ambient temperature for the battery 64. In another embodiment, the controller battery box actively maintains battery temperature at a desired range.

In one embodiment, the controlled battery box 165 provides conditioning of battery temperature important to lift gate operation, such that batteries remain efficient and properly charged for use. The controlled battery box 165 eliminates complex methods to charge batteries in low temperatures (e.g., increasing the charging voltage to batteries). The controlled battery box 165 provides temperature control for batteries stored therein, such that battery capacity remains high.

In one embodiment, the controlled battery box 165 includes one or more temperature control elements comprising one or more passive temperature control elements and/or one or more active temperature control elements.

Figure 2:
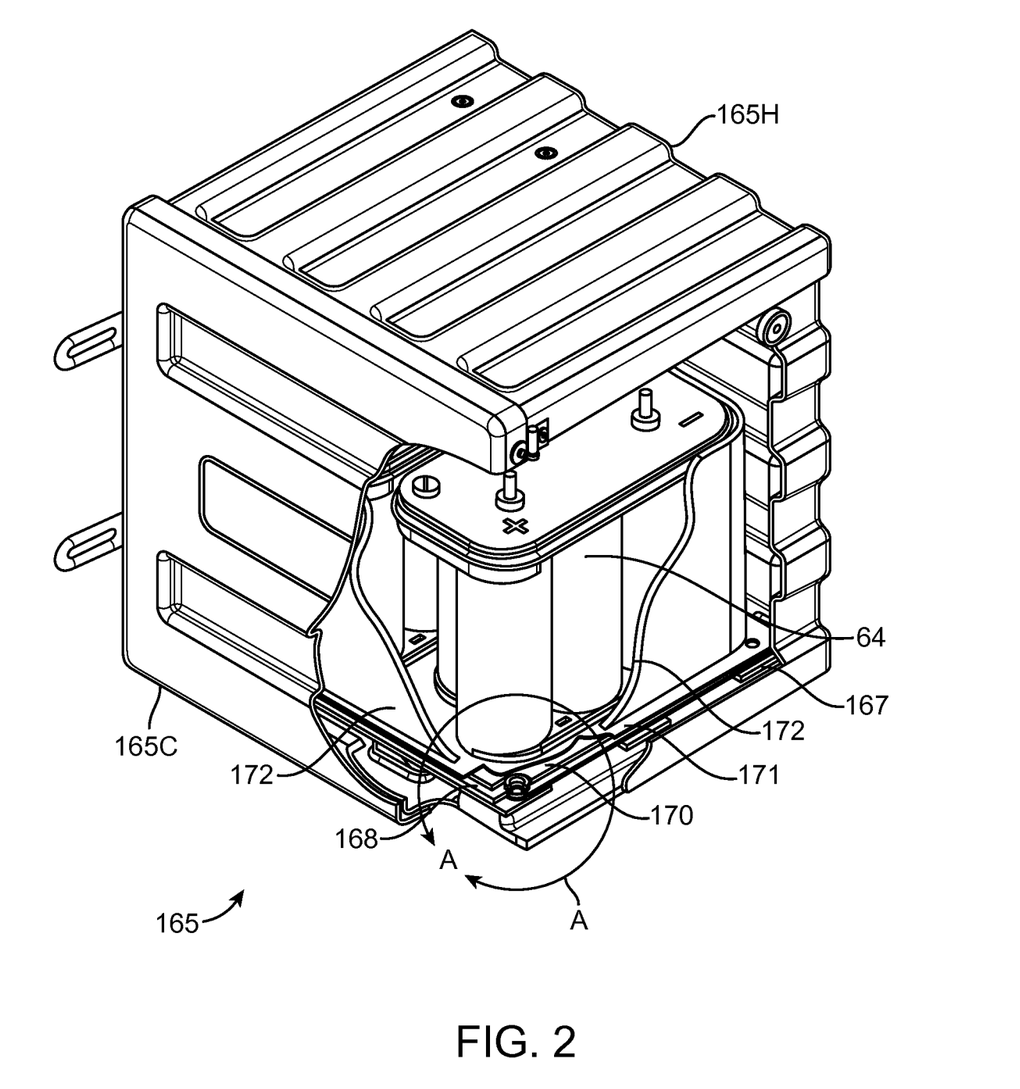
FIG. 2 shows a perspective view of a controlled battery box in FIG. 1, according to an embodiment of the invention.

FIG. 2 shows a perspective view of an embodiment of the controlled battery box 165, according to the present invention, with cut-out portions revealing structure and components of the controlled battery box 165. The controlled battery box 165 comprises an essentially rectangular housing 165H having four side walls and a base wall, and a cover 165C that is removably attached to the housing 165H. The housing 165H and cover 165C together provide an enclosure for housing one or more batteries 64 therein.

In one embodiment of the invention, the housing 165H and cover 165C are made of low thermal conductivity material such as plastics, to act as an insulator as well as a weather elements barrier. A battery box 165 made of plastic material functions as a first barrier to ambient temperature (e.g., heat or cold). For comparison, a steel battery box has a thermal conductivity in units of watts per meter Kelvin of 52 W/mK-54 W/mK, whereas a plastic battery box has a thermal conductivity in units of watts per meter Kelvin of 0.19 W/mK-0.51 W/mK.

Figure 3:
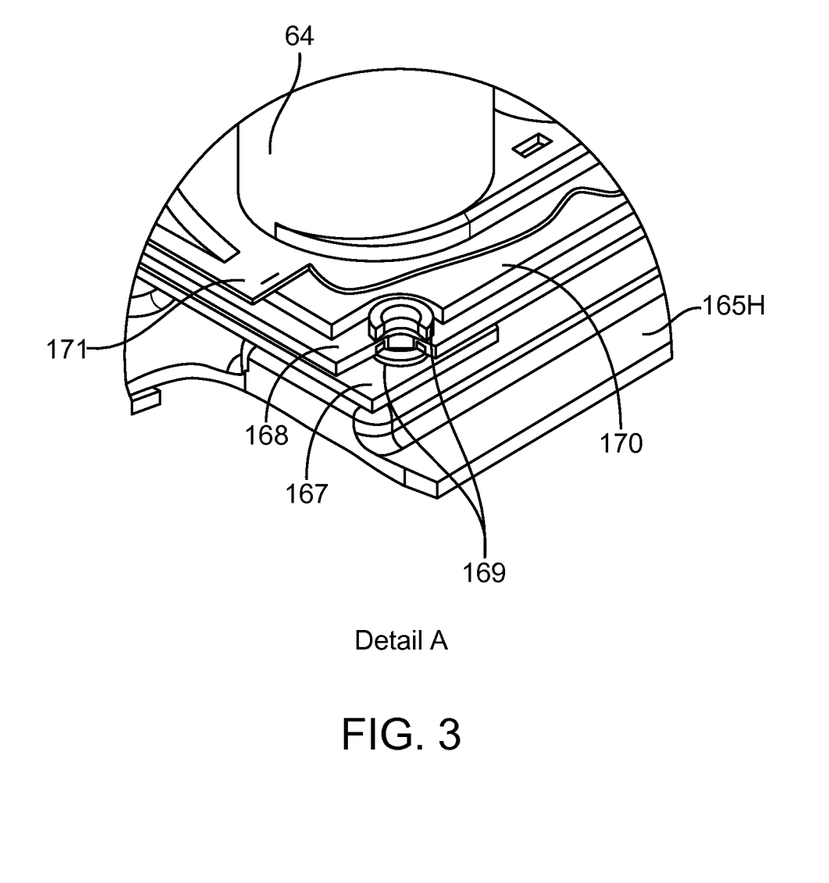
FIG. 3 shows details of a section A of the controlled battery box as indicated in FIG. 2, according to an embodiment of the invention.

FIG. 3 shows details of a section A of the controlled battery box 165 as indicated in FIG. 2. As illustrated, the controlled battery box 165 further comprises multiple elongated planar support bars 167 that are disposed in parallel and spaced from one another in a plane, providing a rigid support mechanism for supporting the weight of one or more batteries 64.

The controlled battery box 165 further comprises an essentially rectangular and planar steel plate 168 separated from the support bars 167 by one or more spacers 169 (e.g., cylindrical washer) disposed between at least one of the support bars 167 and the steel plate 168 at the corners thereof, as shown. In one implementation, the support bars

167 are made of steel bars and are used to distribute battery weight and all other assembly evenly in the battery box 165.

The controlled battery box 165 further comprises an essentially planar aluminum plate 171 separated from the steel plate 168 by one or more spacers 169 (e.g., cylindrical washer) disposed between the steel plate 168 and the aluminum plate 171 at corners thereof.

The steel plate 168 holds all the batteries 64 in place and provides a flat level surface for the control element 170 and batteries 64. The aluminum plate is used to transfer heat evenly to the batteries and works as impact barrier to the temperature control element 170.

In one embodiment of the invention, the controlled battery box 165 further comprises a temperature control element 170 disposed (i.e., "sandwiched") between the steel plate 168 and the aluminum plate 171. In one embodiment, the temperature control element 170 is essentially planar and of the same planar dimensions as that steel plate 168 and the aluminum plate 171.

As shown in FIG. 3, a top spacer 169 is used to align the temperature control element 170 in place and to prevent overtightening on the temperature control element 170. A bottom spacer 169 is used to minimize heat transfer from the steel plate 168 to the support plates 167. In one embodiment, the temperature control element 170 is made of rubber material.

In one embodiment of the invention, the controlled battery box 165 further comprises a temperature control element 172 (FIG. 2) surrounding the batteries 64 along interior of the walls of the battery box 165. In the example shown in FIG. 2, the control element 172 is planar and is disposed in the battery box 165 along interior of the walls of the battery box 165 to encircle the batteries 64.

In use of the controlled battery box 165, each battery 64 is placed in the housing 165H on the aluminum plate 171, wherein the temperature control element 170 is situated below the battery 64, and the temperature control element 172 surrounds the battery 64 within the housing 165H.

In one embodiment of the invention, only the temperature control element 170 is present in the battery box 165. In another embodiment of the invention, only the temperature control element 172 is present in the battery box 165. In another embodiment of the invention both temperature control elements 170 and 172 are present in the battery box 165, wherein the temperature control elements 170 and 172 in combination provide a surround for the batteries 64 from below and sides, respectively.

In one embodiment of the invention, the controlled battery box 165 includes one or more passive temperature control elements and/or one or more active temperature control elements. For example, in one implementation, the temperature control element 170 comprises a passive temperature control element including low thermal conductivity material to act as a thermal insulator.

In another implementation, the temperature control element 172 comprises a passive temperature control element including low thermal conductivity material to act as a thermal insulator. In one implementation, the temperature control element 172 comprises a passive insulator wrap to surround the batteries, for retaining desired temperatures set points in the battery box 165.

In one embodiment of the invention, the temperature control element 170 comprises an active temperature control element, and the temperature control element 172 comprises a passive temperature control element.

In another embodiment of the invention, the temperature control element 172 comprises an active temperature control element, and the temperature control element 170 comprises a passive temperature control element.

In another embodiment of the invention, the temperature control element 170 comprises an active temperature control element, and the temperature control element 172 comprises an active temperature control element.

Further, the cover 165C may further have an active or a passive temperature control unit facing the batteries 64.

According to embodiments of the invention, a passive temperature control element comprises insulation warp material (thermal insulator) disposed within the battery box 165. The passive temperature control element provides as a second ambient temperature barrier to retain desired temperatures around the batteries 64 within the battery box 165. In one example, the passive temperature control element comprises insulation material constructed from acid-resistant composites, with about 0.25 inch (0.635 cm) thickness. Other insulators and thicknesses can be used to reduce heat transfer between interior of the battery box 165 and the exterior environment of the battery box 165, as described herein according to embodiments of the invention.

According to an embodiment of the invention, an active temperature control element comprises a heating element. An example heating element comprises an electric heating pad with a heating element therein, wherein the pad is about 0.25 inch thick (0.635 cm) thick. Other heating pads and thicknesses can be used to reduce heat transfer between interior of the battery box 165 and the exterior environment of the battery box 165, as described herein according to embodiments of the invention.

According to another embodiment of the invention, an active temperature control element comprises a thermoelectric heating/cooling device. In one embodiment, a thermoelectric heating/cooling device comprises a thermoelectric pad about 1.25 inches (3.175 cm) thick. The thermoelectric pad includes a heat sink extended out through battery box assembly from bottom. Other active temperature control elements and thicknesses can be used to reduce heat transfer between interior of the battery box 165 and the exterior environment of the battery box 165, as described herein according to embodiments of the invention.

For an active temperature control element, the power system 141 further comprises a temperature controller that actively maintains temperature within the controlled battery box 165 by selectively controlling operation of each active temperature control element for the controlled battery box 165. In one embodiment of the invention, in response to a signal from a temperature sensor indicating battery temperature, the temperature controller controls the active temperature control element to generate a heating or cooling effect as needed, to reduce the rate of heat transfer between the ambient and the interior of the enclosure, thereby maintaining battery temperature within a selected temperature range. The temperature controller can be placed within the battery box 165.

Figure 4:
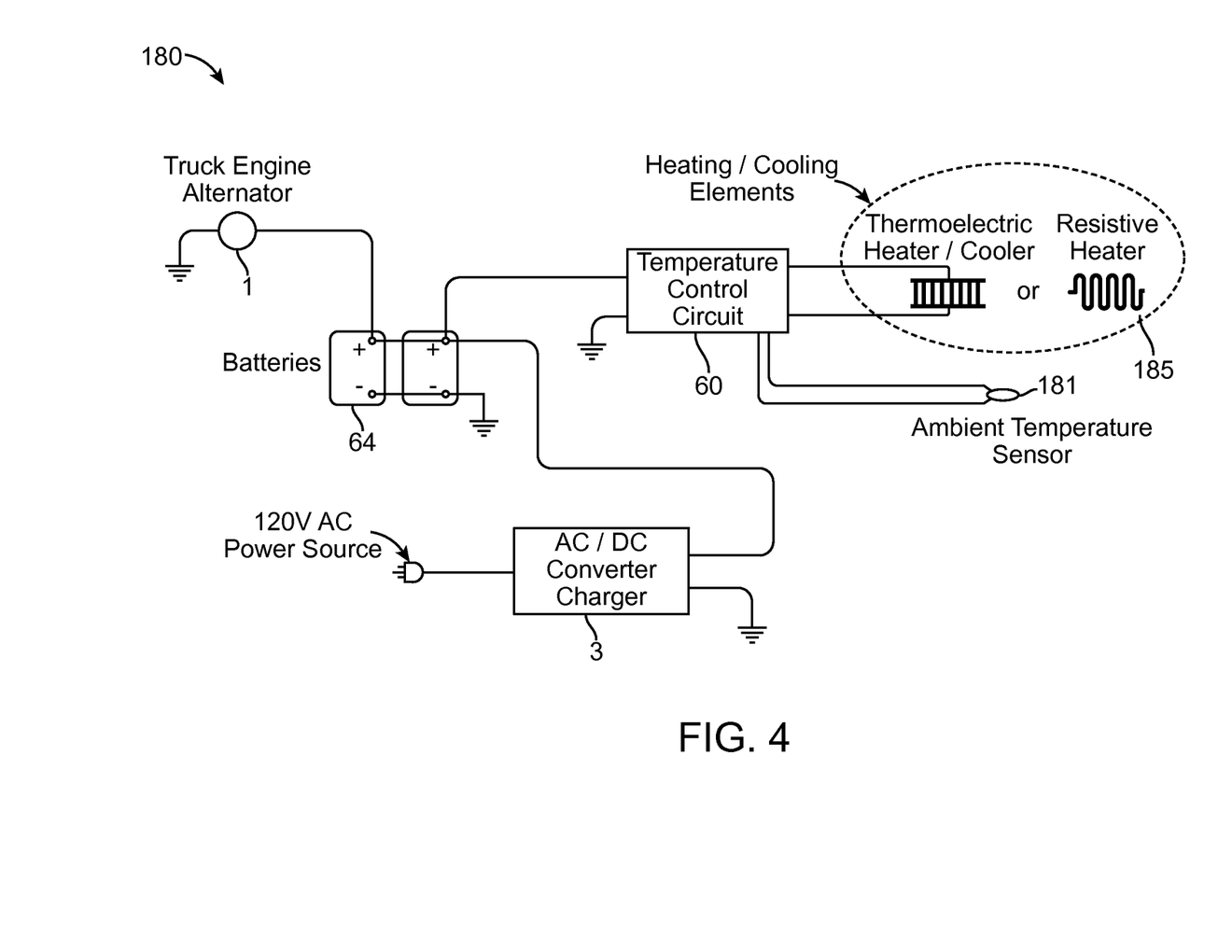
FIG. 4 shows a schematic block diagram of a temperature control circuit for the battery box, according to an embodiment of the invention.

FIG. 4 shows a schematic block diagram of a temperature control circuit 180 for the battery box 165, according to an embodiment of the invention. The temperature control circuit 180 comprises a temperature controller 60 as described and an active temperature control element 185. In one embodiment of the invention, said temperature control element 170 comprises the active temperature control element 185. In one embodiment of the invention, said temperature control element 172 comprises the active temperature control element 185.

In one embodiment of the invention, the active temperature control element 185 comprises an electric heating element as described, wherein when activated by the controller 60, the heating element generates heat to increase the temperature within the battery box 165. In one embodiment, the active temperature control element 185 comprises a thermoelectric device/element, which, when activated by the controller 60, can increase or decrease the temperature within the battery box 165. The thermoelectric device increases temperature within the battery box 165 by generating heat as signaled by the controller 60. The thermoelectric device decreases temperature within the battery box 165 by providing cooling (e.g., sinking heat) as signaled by the controller 60.

The active temperature control element 185 is controlled by the temperature controller 60 based on signals from one or more temperature sensors 181. In one embodiment, an ambient temperature sensor 181 is disposed in the battery box 165 to provide the temperature controller 60 with real-time temperature feedback information indicative of temperature within the battery box 165. In a preferred embodiment of the invention, the temperature sensor 181 is disposed in the battery box 165 in such a way to provide real-time temperature feedback information indicative of the temperature of a battery 64 within the controller box 165.

In one embodiment of the invention, the temperature controller 60 includes a proportional integral derivative (PID) controller circuit comprising a feedback controller that calculates an error value as the difference between temperature measured by the temperature sensor 181 and a desired temperature set point for the interior of the battery box (or preferably a desired temperature set point for the battery, such as about 25° C.). The controller 60 attempts to minimize the error value by adjusting the control inputs to the active temperature control element 185 for changing the temperature in the control box 165 by heat transfer.

Figure 5:
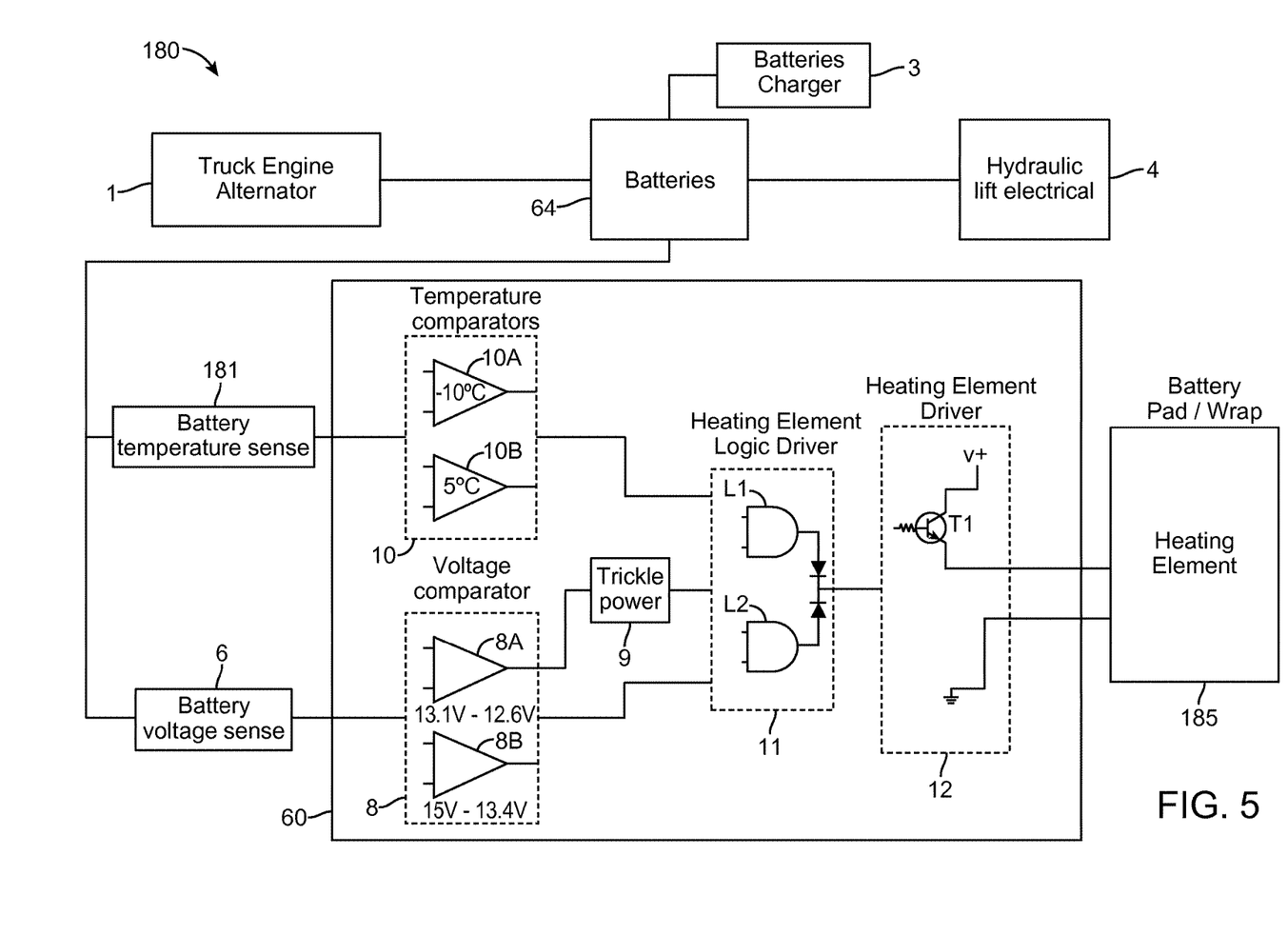
FIG. 5 shows an example block diagram of a temperature control circuit for a battery box with an active temperature control element comprising a resistive heating element, according to an embodiment of the invention.
Figure 6:
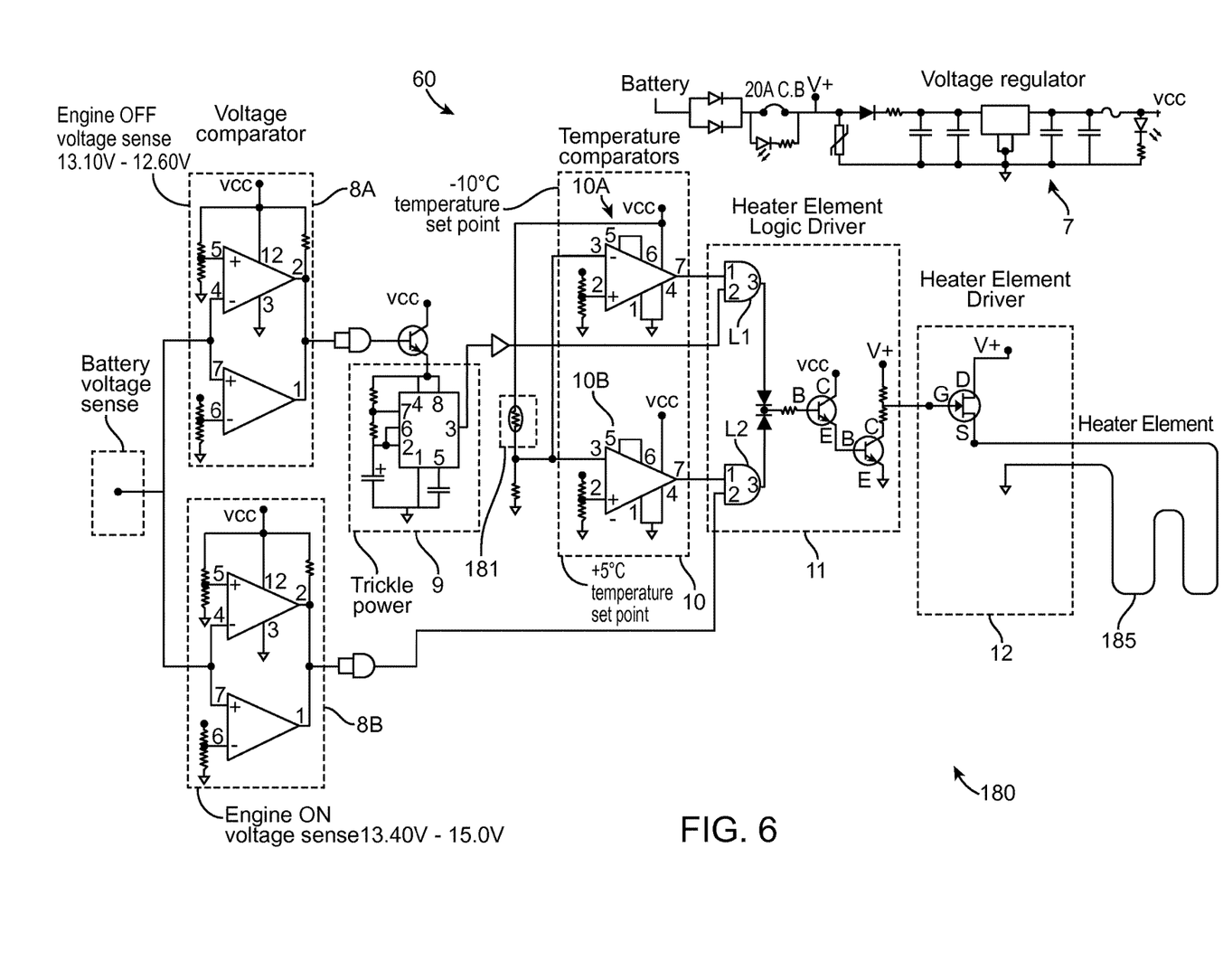
FIG. 6 shows an example circuit implementation of a temperature controller in FIG. 5, according to an embodiment of the invention.

FIG. 5 shows an example block diagram of the temperature control circuit 180 wherein the active temperature control element 185 comprises a resistive heating element, according to an embodiment of the invention. FIG. 6 shows a circuit schematic of an example implementation of the temperature controller 60 of FIG. 5, according to an embodiment of the invention. Referring to FIG. 5 in conjunction with FIG. 6, a vehicle engine alternator 1 normally supplies electrical power for charging connected lift gate batteries 64. In one embodiment, a batteries charger 3 source may also be used as an external AC power to charge the batteries 64 when the lift gate is idle (e.g., stowed), which maintains batteries 64 fully charged for optimum temperature set condition.

A hydraulic lift electrical module 4 comprises electrical valve solenoids, starter solenoid, and electrical motor for the lift gate. Temperature sensor 181 comprises a thermal resistor (thermistors) which changes its resistance with temperature. Thermistor resistance changes drastically with temperature such that in one example there can be 100 Ohms or more of change per temperature degree. Preferably, temperature sensor 181 is mounted on a negative post of a battery 64 (the battery post is most accurate of inner battery temperature). A battery voltage sensor 6 senses voltage of batteries 64. In one embodiment, voltage sensor 6 comprises a copper conductor with extremely low current draw and negligible voltage drop for sensing battery voltage.

The temperature controller 60 comprises a voltage comparator circuit 8 that compares two input signals (i.e., compares a sensed battery voltage to a voltage set point) and switches its output to indicate which is larger. The temperature controller 60 further comprises a temperature comparator circuit 10 which compares input signals representing temperature (i.e., compares a sensed temperature to a temperature set point) and switches its output to indicate which is larger.

The voltage comparator circuit 8 and the temperature comparator circuit 10 operate independently from each other. The voltage comparator circuit 8 compares battery voltage sensor signals to voltage set points, and based on the comparison outputs a high or low signal (e.g., high signal=5V, low signal=0V) to a logic driver 11 for a temperature control element 185. The temperature comparator circuit 10 compares temperature sensor signals to temperature set points and based on the comparison, outputs a high or low signal to the logic driver 11. The logic diver 11 will only activate its output when the set conditions of its inputs are met, as described further below. The logic driver 11 activates a heating element driver 12, which provides power from batteries 64 to activate the temperature control element 185.

In one embodiment, the voltage comparator circuit 8 comprises voltage comparators 8A and 8B, which activate based on input voltage level of the batteries 64. In one example implementation, the voltage comparator 8A has a voltage set point range of 13.1V to 12.6V, selected based on state of charge of the batteries 64. The voltage set point 13.10V indicates that the batteries 64 are at 100% charge, and the voltage set point 12.60V indicates the batteries 64 are at 96% charge. With this example set-point range, the voltage comparator 8A can operate using up to 4% of battery power from batteries 64. The comparator 8A will not operate if the sensed voltage of batteries 64 is under 12.60V, thereby allowing the batteries 64 to slow and low warm up when the vehicle engine (i.e., alternator 1) is OFF. The comparator 8A activates a trickle power circuit 9 when the vehicle engine alternator 1 is OFF.

At this set condition comparator 8A will power up trickle circuit 9 to go high "ON" for 4 minutes and low "OFF" for 16 minutes into logic driver L1 pin1, thus heat element 185 will be ON for 4 minutes and OFF for 16 minutes. The heat element 185 may or may not warm up batteries temperature completely. Because heat element 185ON time is shorter than OFF time (not continues with this set condition oscillator mode) batteries warming time is slower with low retaining temperatures. For example, if the set conditions above are met (engine OFF, battery range 13.10V to 12.60V, and temperature is −10° C.), the heat element 185 will be active to warm up batteries 64 for 4 minutes. However, heat element 185 may elevate batteries temperature up to 25%, and cool down to 15% when the heat element 185 is OFF for 16 minutes. On the second cycle of 4 minutes ON, the heat element 185 will elevate batteries temperature up to additional 25%, with the remaining 10% warm temperature from previous cycle, batteries temperature total up to 35%, and then down to 25% when the heat pad is OFF for 16 minutes. This cycling mode will slowly warm up batteries with low temperature retained from the number of cycles occurring up to 5 hours depending on the batteries state of charge. The purpose of this mode is to keep batteries temperature elevated as possible so that when the alternator 1 is started, the comparator 8A will turn OFF and deactivate trickle power 9, and batteries will warm up faster rather than starting at extreme lower temperatures.

The temperature comparator circuit 10, similar to the voltage comparator function, uses thermistor resistance voltage output of the temperature sensor 181 for comparison. Voltage from thermistor 181 is typically connected to a voltage regulator supply 7 built in the circuit 180. The voltage regulator 7 maintains constant voltage level.

In one embodiment, the temperature comparator circuit 10 comprises temperature comparators 10A and 10B, which compare input signals representing temperature. Temperature comparator circuit 10 which compare input signals representing temperature (i.e., compares a sensed temperature to a temperature set point), and switches its output to indicate which is larger.

In one example, the temperature comparator 10A compares a sensed temperature (from the temperature sensor 181) to a temperature set point of about −10° C. If the sensed temperature drops below about −10° C., the temperature comparator 10A generates an output signal to cause the heating element 185 to increase the temperature within the battery box 185. This prevents battery ambient temperature within the battery box 165 from dropping below about −10° C., thus allowing shorter battery warm up time for proper operation of the battery 64.

In one embodiment of the invention, with a temperature set point of −10° C. for the temperature comparator 10A, the output signal of the temperature comparator 10A causes activation of the heating element 185 only with trickle power circuit 9 activated by the voltage comparator 8A with voltage set point between 13.10V and 12.60V.

In one example, the temperature comparator 10B compares a sensed temperature (from the temperature sensor 181) to a temperature set point of about 5° C. If the sensed temperature drops below about 5° C., the temperature comparator 10B generates an output signal to cause the heating element 185 to increase the temperature within the battery box 185. This prevents battery ambient temperature within the battery box 165 from dropping below about 5° C.

In one embodiment, with a temperature set point of 5° C. for the temperature comparator 10B, the output signal of the temperature comparator 10B causes activation of the heating element 185 only with a voltage set point of between about 13.40V and 15.00V for voltage comparator 8B. The voltage comparator 8B has a set point voltage range of 13.4V to 15.0V and is used to indicate that the vehicle engine alternator 1 is ON.

The trickle power circuit 9 comprises an ON/OFF oscillator circuit activated when the voltage set point condition for voltage comparator 8A is met (i.e., when sensed battery voltage at comparator 8A voltage is between 13.10V and 12.60V to indicate that the engine is OFF, whereby the comparator 8A output becomes high to activate the trickle power circuit 9). In one example, the oscillator signals for 4 minutes ON and 16 minutes OFF continually, to the logic driver 11 that drives the heating element driver 12 for powering the heating element 185. The purpose of the ON/OFF mode is for lowering power consumption from battery 64, and the battery 64 is activated for powering the heating element 185 only when its voltage is at 13.10V but not under 12.60V, to preserve battery state of charge.

In one embodiment, the logic driver 11 comprises logic drivers L1 and L2 which are low signal components to activate or to deactivate the heating element driver 12. In one example, the aforementioned set conditions for logic driver L1 include: (a) sensed battery voltage input to voltage comparator 8A is under a voltage set point of about 13.10V and over 12.60V (thus activating trickle power circuit 9), and (b) a sensed temperature input to the temperature comparator 10A is under a temperature set point of about −10° C. In one example the set conditions for the logic driver L2 include: (a) a sensed battery voltage input to voltage comparator 8B is under a voltage set point of about 15.00V and over 13.40V, and (b) a sensed temperature input to the temperature comparator 10B is under a temperature set-point of about 5° C. The temperature and voltage set point and ranges provided herein are examples only and other values may also be selected for proper battery operation, as those skilled in the art with recognize.

The circuit logic driver L1 of the logic driver 11 is coupled to the output signal from the trickle power circuit 9, wherein the circuit logic driver L1 activates the heating element 185 (via driver 12) when sensed battery temperature conditions are at or under about −10° C., in one example.

In one embodiment of the invention, the engine alternator 1 is the primary source for powering the active temperature control elements. For example, when voltage of batteries 64 is between 15.00V and 13.40V, the engine alternator 1 is the primary source for powering the active temperature control element. However, the batteries 64 may power the active temperature control element only if there is sufficient battery charge (e.g., 96% or more of battery state of charge), as monitored by the voltage comparator 8A (e.g., voltage set point of about 13.10V to 12.60V for the voltage comparator 8A, along with trickle power from circuit 9 for batteries 64).

In one embodiment, if the temperature sensed by the sensor 181 is greater than the temperature set-point, the heating element 12 will remain OFF. In one example, this provides trickle power from the circuit 9 when the temperature sensor 181 senses a battery ambient temperature of about −10° C. This maintains battery ambient temperature above −10° C. (e.g., for 5 hours) within the battery box 165.

As noted, the logic diver 11 will only activate its output when the set conditions of the logic drivers L1 and L2 are met. An example logic driver comprises an AND gate. As shown in FIG. 6, input pin1 and pin2 of gate L1 must have high signals to activate output pin3 to high. Similarly, input pin1 and pin2 of gate L2 must have high signals to activate output pin3 to high. As such, the logic (AND GATE) set condition for L1, L2, are as follows:

pin1 high+pin2 high=pin3 high (element driver 12 is ON)
pin1 low+pin 2 high=pin3 low (element driver 12 is OFF)
pin1 high+pin2 low=pin3 low (element driver 12 is OFF)
pin1 low+pin2 low=pin3 low (element driver 12 is OFF)

In one example application, if the sensed battery voltage at voltage comparator 8A is between 13.10V and 12.60V, the voltage comparator 8A sends a signal high to activate trickle signal 9 to high and then to logic driver L1 input pin1, however if the temperature sensor 181 senses −9° C., the temperature comparator 10A will not activate, thus the input signal to the logic driver L1 input pin2 is low. Thus, output pin3 of logic L1 does activate (remains low) and does not generate a signal to drive (activate) the heat elements driver 12.

In another example application, if the sensed battery voltage at voltage comparator 8A is under 12.60V, the voltage comparator 8A generates a low signal whereby the trickle signal 9 is not activated, causing a low signal to pin1 of logic driver L1, however if the temperature sensor 181 is senses −11° C., the temperature comparator 10A activates and sends a low signal to pin 2 of the logic driver L1. Thus, logic L1 output pin3 does not activate (remains low) without generating a signal to drive the heat elements driver 12.

A heater element driver 12 comprises a 20 ampere power MOSFET controlled by circuit logic outputs. The heating element 185 converts electricity into heat through resistive heating, wherein passage of an electrical current through the element 185 encounters resistance resulting in heating of the element 185 and increasing the temperature within the battery box 165.

Figure 7:
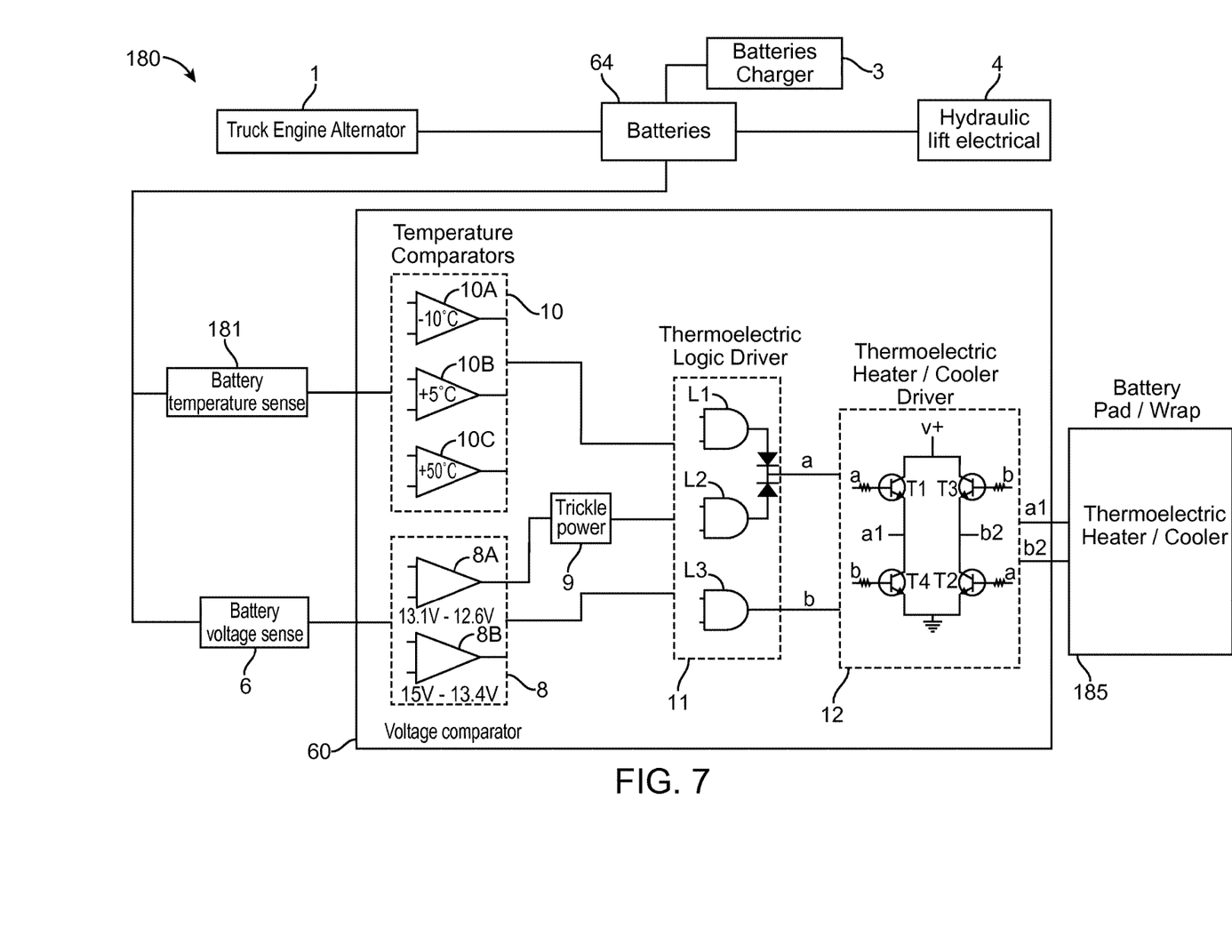
FIG. 7 shows an example block diagram of a temperature control circuit for a battery box and an active temperature control element comprising a thermoelectric element, according to an embodiment of the invention.
Figure 8:
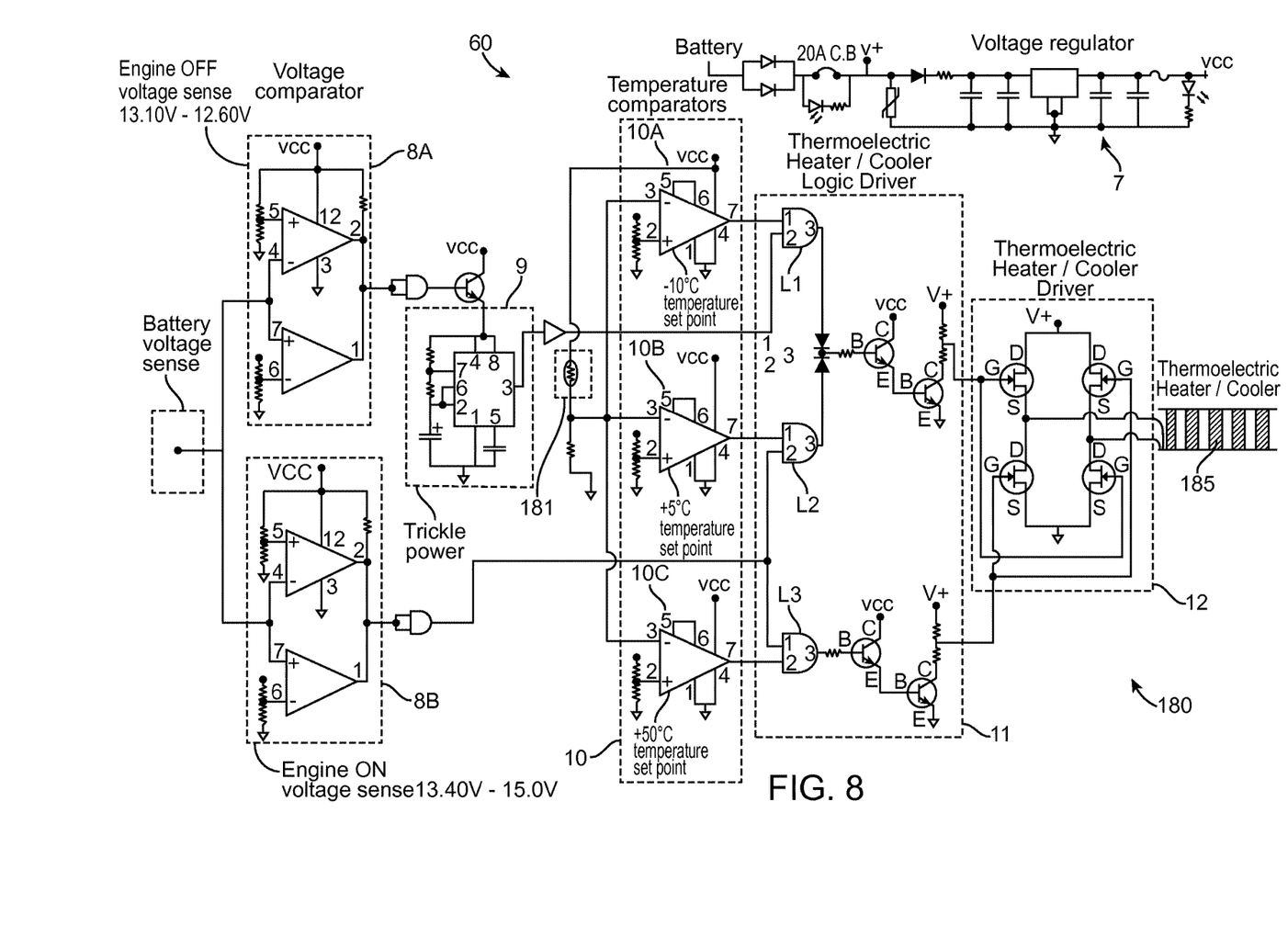
FIG. 8 shows an example circuit implementation of a temperature controller in FIG. 7, according to an embodiment of the invention.

FIG. 7 shows an example block diagram of the temperature control circuit 180 wherein the active temperature control element 185 comprises a thermoelectric element for heating and cooling, according to an embodiment of the invention. FIG. 8 shows a circuit schematic for an example implementation of the temperature controller 60 of FIG. 7, according to an embodiment of the invention. A thermoelectric element provides heating and cooling using a thermoelectric effect. The thermoelectric effect is the direct conversion of temperature differences to electric voltage, vice-versa. A thermoelectric device generates a voltage when there is a different temperature on each side. Conversely, when a voltage is applied to the thermoelectric device, thermoelectric device creates a temperature difference. This effect can be used to generate electricity, measure temperature, or change the temperature of objects. Because the direction of heating and cooling is determined by the polarity of the applied voltage, thermoelectric devices are efficient temperature controllers.

The circuits in FIGS. 7-8 are configured similar to those in FIGS. 5-6, with an additional temperature comparator 100 set point at about e.g. 50° C., an additional logic circuit L3, and a corresponding thermoelectric element driver. The purpose of the temperature set point for temperature comparator 100 is such that when battery ambient temperature in the battery box exceeds 50° C., the temperature comparator 100 activates logic driver L3 which reverses polarity at the thermoelectric element 185, causing it to cool battery ambient temperature back to the set point 50° C. in the battery box 165. The set conditions for logic driver L3 include: (a) sensed battery voltage input to voltage comparator 8B is under 15.00V and over 13.40V, and (b) sensed temperature input to the temperature comparator 100 is over 50° C. The logic (AND GATE) set condition for L1, L2, L3 are as follows:

pin1 high+pin2 high=pin3 high (element driver 12 is ON)
pin1 low+pin 2 high=pin3 low (element driver 12 is OFF)
pin1 high+pin2 low=pin3 low (element driver 12 is OFF)
pin1 low+pin2 low=pin3 low (element driver 12 is OFF)

The thermoelectric drivers 12 in FIGS. 7-8, are in H bridge configuration with 20 ampere MOSFEFs. An H bridge is an electronic circuit that enables a voltage to be applied across a load in either direction, often used to reverse polarity in an intended application.

The input source of each temperature comparator is from the temperature sensor 181. As shown in FIG. 6 and FIG. 8, input pin3 of each temperature comparator is connected to the sensor 181, and input pin2 is connected to a preset resistive value representing a set point temperature. The preset values on pin2 of each temperature comparator will determine the set condition of temperatures requirement. In one embodiment, the temperature set points are programmable and can be set by an operator.

Each temperature comparator when activated compares the sensed temperature variable value on pin3 to the temperature set point value on pin2. If the pin3 input value is above pin2 value, the temperature compotator output pin1 becomes high, and when the pin3 input value drops below pin2 input value, the comparator output pin 1 becomes low (e.g., high signal=5V low signal=0V).

The voltage comparator function is similar to temperature comparators with respect to its inputs and outputs, however, the voltage comparator provide an additional function that sets voltage upper and lower limits. For example, comparator 8A voltage set upper and lower limits are 13.10V and 12.60V, respectively, and 8B voltage set upper and lower limits are 15.00V and 13.40V, respectively. The voltage source is from the battery voltage sense 6. Combining both temperature and voltage comparators output signals, the high and low will allow the logic AND GATE driver to function to set conditions, detailed above.

In one embodiment of the invention, the controller 60 does not include the voltage comparator circuit 8 and trickle power circuit 9.

Different temperatures affect internal chemical reaction rates, internal resistance, and efficiency of batteries. An example of temperature affect on battery state is summarized below:

Run times will vary as temperatures change:
Batteries are significantly less efficient under heavy discharges at lower temperatures:
Increasing efficiency as the temperature rises above 25° C. (77° F.).
Decreasing efficiency as the temperature drops below 25° C. (77° F.).
Charge times will vary as temperatures change:
Batteries are significantly less efficient when being charged at lower temperatures:
Increasing efficiency as the temperature drops below 25° C. (77° F.).
Decreasing efficiency as the temperature rises above 25° C. (77° F.).
Battery life will vary when operated at different temperatures:
Continued operation at higher temperatures will shorten battery life:
Increasing life as the temperature drops below 25° C. (77° F.).
Decreasing life as the temperature rises above 25° C. (77° F.).

Figure 9:
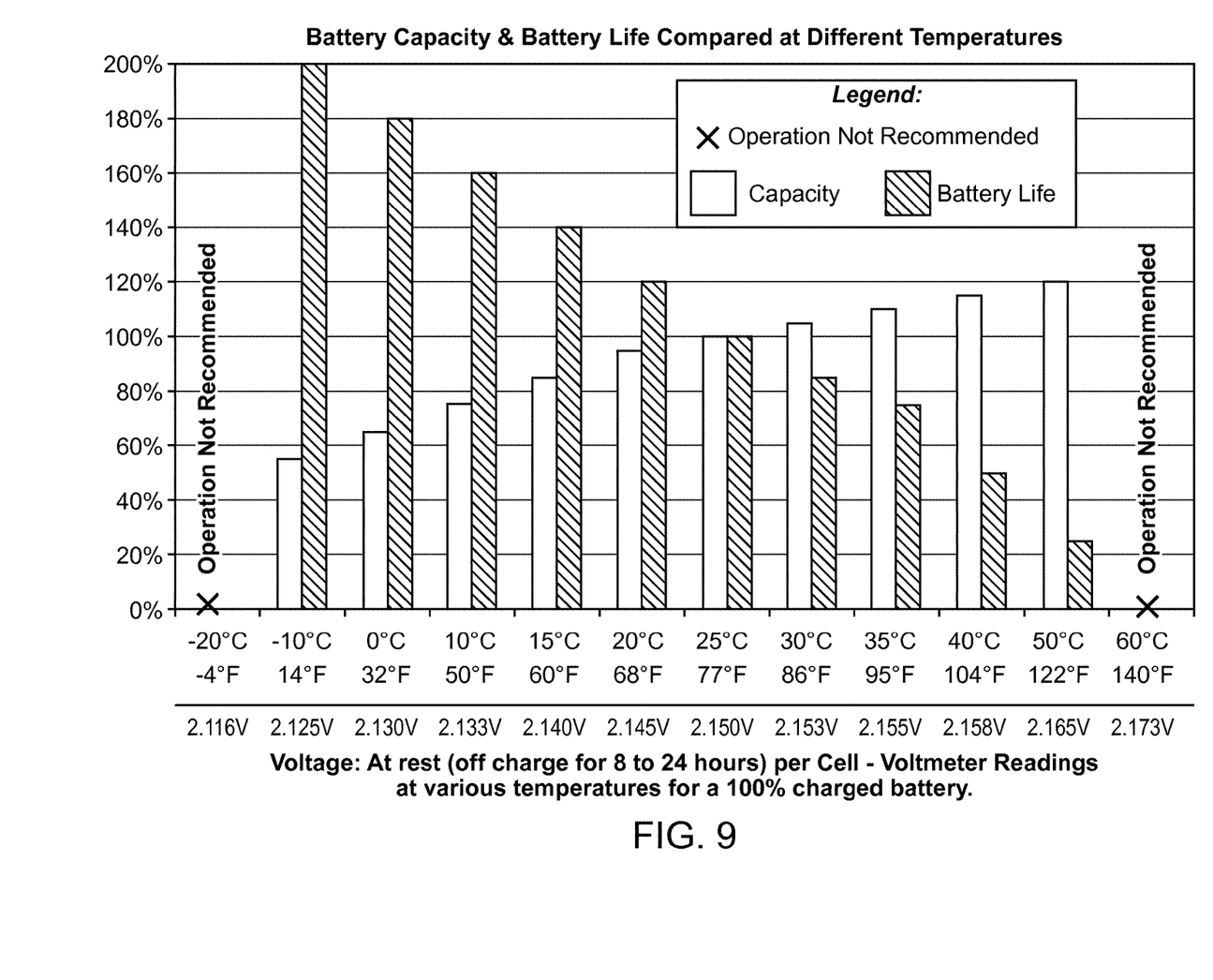
FIG. 9 represents an example graphical representation of the overall effect of temperatures on a battery in terms of battery life and capacity versus ambient temperature surrounding the battery.

FIG. 9 represents an example graphical representation of the overall effect of temperatures on a battery in terms of battery life and capacity versus ambient temperature surrounding the battery. As shown in FIG. 9, in one example, the optimum battery operating conditions are when the temperature of the ambient environment surrounding the battery is at about 25° C. (77° F.). According to an embodiment of the invention, the controlled battery box 165 controls temperature within the battery box to maintain an optimum set of conditions for efficiency of the battery 64 within the battery box 165, based on the above parameters.

As noted, according to embodiments of the invention, the controlled battery box 165 includes one or more temperature control elements comprising one or more passive temperature control elements and/or one or more active temperature control elements. For example, for cold climate conditions, a battery box 165 with one of the following configurations can be used: active temperature control element only (heat pad) or passive temperature control element only (insulation wrap). For extreme cold climate conditions, a battery box 165 with both heat pad and insulation warp can be used. For warm or hot climate conditions, a battery box 165 with a thermoelectric device provides cooling when ambient temperatures rise and provides heating when ambient temperatures drop. The electrical terminals of the active temperature control elements are electrically coupled to the batteries via the temperature controller 60.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other modifications may occur to those ordinarily skilled in the art.

What is claimed is:

1. A battery container for battery temperature control, comprising:
   a housing including an enclosure for receiving a battery, wherein at least a portion of the housing comprises a thermal insulation material for insulating the interior of the enclosure against ambient temperature, and wherein the battery is a dedicated battery; and
   a temperature control element comprising an active temperature control element; and
   a controller programmed to, in response to a first signal indicating battery temperature and a second signal indicating battery state of charge, wherein battery state of charge is related to battery voltage, control the temperature control element to maintain the battery temperature within a selected temperature range, wherein the active temperature control element comprises a thermoelectric device, wherein the controller is programmed to operate the thermoelectric device to selectively provide heating or cooling.

2. The battery container of claim 1, wherein:
   the temperature control element comprises a passive temperature control element including thermal insulation.

3. The battery container of claim 2, wherein:
   the housing comprises a rectangular container including a bottom wall, side walls, and atop wall; and
   the thermal insulation of the temperature control element comprises an essentially planar thermal insulation within the container for surrounding at least a portion of a battery when placed in the container.

4. The battery container of claim 1, wherein:
   in response to said signal indicating battery temperature and said signal indicating battery state of charge comprising voltage, the controller is programmed to control the active temperature control element to maintain the battery temperature within a selected temperature range, and wherein batter state of charge indicates battery voltage.

5. The battery container of claim 1, wherein:
   in response to said first signal indicating battery temperature and said second signal representing battery state of charge comprising voltage, the controller is programmed to control the active temperature control element to maintain the battery temperature within a selected temperature range for powering an electrical load.

6. The battery container of claim 1, wherein:
   the controller comprises a temperature comparator programmed to compares a signal indicating battery temperature to a signal indicating a temperature set-point to detect a temperature difference therebetween; and
   based on the detected difference the controller is programmed to control the active temperature control element to reduce the temperature difference.

7. The battery container of claim 6, wherein:
   the controller further comprises a voltage comparator that is programmed to compare a signal indicating battery voltage to a signal indicating a battery voltage set point, to detect a battery state of charge; and
   the controller is programmed to control the active temperature control element to reduce the temperature difference further based on said detected battery state of charge.

8. The battery container of claim 1, wherein:
   the active temperature control element comprises an electrical heating device.

9. The battery container of claim 8, wherein:
   the controller is programmed to control the active temperature control element to maintain the battery temperature within a selected temperature range for battery operation, based on one or more of: battery capacity, battery run time, battery charge time, battery efficiency and battery life.

10. The battery container of claim 8, further comprising:
    a passive temperature control element including thermal insulation disposed within the container for surrounding at least a portion of a battery when placed in the container.

11. The battery container of claim 8, wherein:
    the controller is programmed to activate the active temperature control element only when the battery state of charge is within a selected battery state of charge range.

12. The battery container of claim 1, further comprising:
    a passive temperature control element including thermal insulation disposed within the container for surrounding at least a portion of a battery when placed in the container.

13. The battery container of claim 1, wherein:
    the temperature control element comprises an active temperature control device and a passive temperature control device, such that the controller is programmed to control the active temperature control device.

14. A control system for a battery container, the system comprising:
    a temperature sensor for sensing temperature within the container;
    a sensor for detecting battery state of charge of a battery in the container, wherein the battery is a dedicated battery; and
    a controller programmed to, in response to a first signal from the temperature sensor and a second signal from the battery state of charge sensor, wherein battery state of charge is related to battery voltage, control an active temperature control element to maintain the battery temperature within a selected temperature range by selectively providing heating or cooling.

15. The control system of claim 14, wherein:
in response to said first signal indicating battery temperature and said second signal representing battery state of charge comprising voltage, the controller is programmed to control the active temperature control element to maintain a temperature within the battery container above a selected temperature range, and wherein battery state of charge indicates battery voltage.

16. The control system of claim 15, wherein:
the controller is programmed to maintain temperature within the battery container between about −10° C. and 50° C.

17. The control system of claim 16, wherein:
the controller is programmed to maintain said temperature within the container at about 25° C.

18. The control system of claim 14, wherein:
the controller comprises a temperature comparator that is programmed to compare a signal indicating battery temperature to a signal indicating a temperature set-point to detect a temperature difference therebetween; and
based on the detected difference, the controller is programmed to control the active temperature control element to reduce the temperature difference.

19. The control system of claim 18, wherein:
the controller further comprises a battery state of charge comparator that is programmed to compare said signal indicating battery state of charge to a signal indicating a battery state of charge set-point, to detect a battery state of charge; and
the controller is programmed to control the active temperature control element to reduce the temperature difference based on said detected battery state of charge.

20. A lift gate system, comprising:
a lift gate assembly including a lifting platform coupled to a linkage mechanism, and an actuator for moving the lifting platform via the linkage mechanism;
a battery for powering the actuator for moving the lifting platform;
a battery container for housing said battery, the battery container including an enclosure for receiving the battery, wherein at least a portion of the housing comprises a thermal insulation material for insulating the interior of the enclosure against ambient temperature, and wherein the battery container is disposed proximate the lift gate assembly and the battery comprises a dedicated lift gate battery that only provides electrical power for operation of the lift gate assembly; and
a temperature control element; and
a controller programmed to, in response to a first signal indicating battery temperature and a second signal indicating battery state of charge, wherein battery state of charge is related to battery voltage, control the temperature control element to maintain the battery temperature within a selected temperature range by selectively providing heating or cooling.

21. The lift gate system of claim 20, wherein the temperature control element comprises an active temperature control element.

22. The lift gate system of claim 21, further comprising:
a temperature sensor for sensing temperature of the battery from a battery terminal post; and
wherein in response to a said first signal from the temperature sensor and said second signal from the battery state of charge sensor, the controller programmed to control the active temperature control element to maintain the battery temperature within a selected temperature range.

23. The lift gate system of claim 22, wherein:
the controller is programmed to activate the active temperature control element only when the battery state of charge is within a selected battery state of charge range.

24. The lift gate system of claim 22 wherein:
the controller comprises a temperature comparator that is programmed to compare a signal indicating battery temperature to a signal indicating a temperature set point to detect a temperature difference therebetween; and
based on the detected difference, the controller is programmed to control the active temperature control element to reduce the temperature difference.

25. The lift gate system of claim 24 wherein:
the controller further comprises a battery state of charge comparator that is programmed to compare a signal indicating battery state of charge to a signal indicating a battery state of charge set point, to detect a battery state of charge; and
the controller is programmed to control the active temperature control element to reduce the temperature difference based on said detected battery state of charge, wherein battery state of charge indicates battery voltage.

26. The lift gate system of claim 21, wherein:
the controller is programmed to maintain temperature within the container between about −10° C. and 50° C.

27. A control system for a battery container, the system comprising:
a temperature sensor for sensing temperature within the container;
a sensor for detecting battery state of charge of a battery in the container, wherein the battery is a dedicated battery; and
a controller programmed to, in response to a first signal from the temperature sensor and a second signal from the battery state of charge sensor, wherein battery state of charge is related to battery voltage, control an active temperature control element to maintain the battery temperature within a selected temperature range by providing heating.

28. The control system of claim 14 wherein the battery is a dedicated battery, wherein the dedicated battery only provides electrical power to an electrical circuit.

29. The control system of claim 27, wherein battery state of charge indicates battery voltage.

* * * * *

UNITED STATES PATENT AND TRADEMARK OFFICE
CERTIFICATE OF CORRECTION

PATENT NO. : 9,882,252 B2  
APPLICATION NO. : 14/361693  
DATED : January 30, 2018  
INVENTOR(S) : George Y. Marji Page 1 of 1

It is certified that error appears in the above-identified patent and that said Letters Patent is hereby corrected as shown below:

In the Claims

Column 15, Lines 54-55 Claim 3, the text "the housing comprises a rectangular container including a bottom wall, side walls, and atop wall" should instead read "the housing comprises a rectangular container including a bottom wall, side walls, and a top wall"

Column 15, Lines 65-66 Claim 4, the text "and wherein batter state of charge indicates battery voltage" should instead read "and wherein battery state of charge indicates battery voltage"

Signed and Sealed this
Fifth Day of June, 2018

Andrei Iancu
*Director of the United States Patent and Trademark Office*